United States Patent
Kuznetsov et al.

(10) Patent No.: US 6,291,090 B1
(45) Date of Patent: Sep. 18, 2001

(54) METHOD FOR MAKING METAL-AIR ELECTRODE WITH WATER SOLUBLE CATALYST PRECURSORS

(75) Inventors: Irena Kuznetsov, Lawrenceville; Milton Neal Golovin, Marietta, both of GA (US)

(73) Assignee: AER Energy Resources, Inc., Symrna, GA (US)

( * ) Notice: Subject to any disclaimer, the term of this patent is extended or adjusted under 35 U.S.C. 154(b) by 0 days.

(21) Appl. No.: 09/154,812

(22) Filed: Sep. 17, 1998

(51) Int. Cl.[7] .................................................. H01M 4/90
(52) U.S. Cl. ............................................................. 429/27
(58) Field of Search .................................. 429/27, 40, 44, 429/101; 29/623.1; 502/101

(56) References Cited

U.S. PATENT DOCUMENTS

| | | |
|---|---|---|
| 3,592,695 | 7/1971 | Moran . |
| 3,793,083 | 2/1974 | Paynter ................................ 136/120 |
| 3,899,357 | 8/1975 | Rinaldi et al. ....................... 136/121 |
| 3,948,684 | 4/1976 | Armstrong ........................... 136/120 |
| 3,977,901 | 8/1976 | Buzzelli ................................. 136/86 |
| 4,091,175 | 5/1978 | Höhne .................................... 429/40 |
| 4,132,619 | 1/1979 | Klein et al. ........................... 204/242 |
| 4,333,993 | 6/1982 | Gibbard ................................. 429/27 |
| 4,341,848 | 7/1982 | Liu et al. ................................ 429/27 |
| 4,380,576 | 4/1983 | Yoshida et al. ........................ 429/27 |
| 4,448,856 | 5/1984 | Zuckerbrod et al. .................. 429/27 |
| 4,518,488 | 5/1985 | Wennerberg ......................... 208/216 |
| 4,615,954 | 10/1986 | Solomon et al. ..................... 429/27 |
| 4,643,235 | 2/1987 | Schmoede et al. .................... 141/1.1 |
| 4,647,359 | 3/1987 | Lindstrom ............................ 204/294 |
| 4,670,360 | 6/1987 | Habermann et al. ................... 429/33 |
| 4,794,054 | 12/1988 | Ito et al. ................................. 429/44 |
| 4,822,699 | 4/1989 | Wan ....................................... 429/40 |
| 4,877,694 | 10/1989 | Solomon et al. ...................... 429/27 |
| 4,937,220 | 6/1990 | Nickols, Jr. .......................... 502/185 |
| 4,954,474 | 9/1990 | Tsurumi et al. ...................... 502/185 |
| 5,178,971 | 1/1993 | Itoh et al. .............................. 429/40 |
| 5,306,579 | 4/1994 | Shephard, Jr. et al. ............... 429/40 |
| 5,318,862 | 6/1994 | Liu et al. ............................... 429/27 |
| 5,453,169 | 9/1995 | Callstrom et al. ................... 204/242 |
| 5,453,332 | 9/1995 | Sakairi et al. ......................... 429/40 |
| 5,506,067 | 4/1996 | Tinker ................................... 429/27 |
| 5,532,086 | 7/1996 | Thibault et al. ..................... 429/245 |
| 5,563,004 | 10/1996 | Buzzelli et al. ....................... 429/27 |
| 5,567,284 | 10/1996 | Bauer et al. ......................... 204/256 |
| 5,569,551 | 10/1996 | Pedicini et al. ....................... 429/27 |
| 5,639,568 | 6/1997 | Pedicini et al. ....................... 429/27 |
| 5,645,809 | 7/1997 | Callstrom et al. ................... 423/445 |

FOREIGN PATENT DOCUMENTS

| | | |
|---|---|---|
| 0 059 811 | 9/1982 | (EP) . |
| WO 94/10714 | 5/1994 | (WO) . |

OTHER PUBLICATIONS

Gamburzev, Sergei, et al.; Prospects for Development of Metal Hydride–Air Secondary Battery; Electrochemical Society Proceeding; vol. 96–16, pp. 166–173, 1997, No Month Available.

*Primary Examiner*—Carol Chaney
*Assistant Examiner*—Susy Tsang
(74) *Attorney, Agent, or Firm*—Sutherland Asbill & Brennan

(57) ABSTRACT

A bifunctional air electrode for a rechargeable metal-air cell is made with water soluble oxygen reduction and oxygen evolution catalyst precursors. The resulting air electrode exhibits greater power output than a conventional air electrode.

17 Claims, 2 Drawing Sheets

METHOD FOR MAKING METAL-AIR ELECTRODE WITH WATER SOLUBLE CATALYST PRECURSORS

TECHNICAL FIELD

This invention relates to rechargeable metal-air cells, and more particularly, relates to the composition and manufacture of an air electrode for use in a metal-air cell.

BACKGROUND OF THE INVENTION

Metal-air cells have been recognized as a desirable means by which to power portable electronic equipment such as personal computers because such cells have a relatively high power output with relatively low weight as compared to other types of electrochemical cells. Metal-air cells utilize oxygen from the ambient air as a reactant in the electrochemical process rather than a heavier material such as a metal or metallic composition.

Metal-air cells use one or more air permeable cathodes separated from a metallic anode by an aqueous electrolyte. During the operation of a metal-air cell, such as a zinc-air cell, oxygen from the ambient air is converted at the cathode to hydroxide ions and zinc is oxidized at the anode and reacts with the hydroxide ions, such that water and electrons are released to provide electrical energy.

Recently, metal-air recharging technology has advanced to the point that metal-air cells are rechargeable and are useful for multiple discharge cycles. An electronically rechargeable metal-air cell is recharged by applying voltage between the anode and the cathode of the cell and reversing the electrochemical reaction. Oxygen is discharged back to the atmosphere through the air-permeable cathode and hydrogen is vented out of the cell.

Metal-air cells may be arranged in multiple cell battery packs to provide a sufficient amount of power output for devices such as computers. An example of a metal-air power supply is found in commonly owned U.S. Pat. No. 5,354,625 to Bentz et al., entitled Metal-Air Power Supply and Air Manager System, and Metal-Air Cell for Use Therein, the disclosure of which is incorporated herein by reference.

Attempts to increase even further the power output of metal-air cells have had mixed results. Increasing the power output of a cell usually involves operating the cell at a higher current drain. Such a higher load, however, can significantly decrease the total energy density of the system and greatly increase the production of heat, both of which are detrimental to efficiency and lifetime of the cell.

The composition of the air electrode or cathode is important in determining the power production capabilities and efficiencies of a metal-air cell. Air electrodes typically comprise carbon particles such as carbon black, an oxygen reduction catalyst, and a non-wetting binder such as tetrafluoroethylene. Secondary air electrodes also include an oxygen evolution catalyst. Oxygen reduction catalysts are also referred to as discharge catalysts and oxygen evolution catalysts are also referred to as recharge catalysts.

Suitable discharge catalysts include silver, cobalt oxides or spinels, transition metal macrocyclics, and perovskites. Suitable oxygen evolution catalysts include nickel, cobalt, iron, and tungsten compounds. These catalysts, with the exception of silver, are often added to the air electrode in the form of oxides in powder form. Generally described, an air electrode is formed by mixing carbon black, the catalyst powders and a non-wetting binder, forming this mixture into a sheet and adhering the sheet to a current collector.

Although the above described electrodes are effective in a metal-air cell, there remains a need for increased power output from a metal-air power supply without comprising the efficiency and lifetime of the cell.

SUMMARY OF THE INVENTION

The present invention fulfills the above described need by providing an air electrode made with water soluble catalyst precursors, a method for making such air electrodes, and a metal-air cell including such an air electrode. The water soluble catalyst precursors are applied to carbon particles in the form of an aqueous solution. The water soluble catalyst precursors desirably include one or more water soluble oxygen evolution catalyst precursors and can also include one or more water soluble oxygen reduction catalyst precursors. The resulting mixture of catalyst precursors and carbon particles is dried and then combined with other ingredients to form the air electrode. Metal-air cells containing such an air electrode made with water soluble catalyst precursors unexpectedly provide more power than metal-air cells including an air electrode made with catalyst powders instead of water soluble catalyst precursors.

More particularly, this invention encompasses a method for making a bifunctional air electrode for use in a rechargeable metal-air electrochemical cell. This method comprises wetting carbon particles with at least one water soluble oxygen evolution catalyst precursor in aqueous solution in aqueous solution to form a wetted carbon particle mixture. The mixture can also include one or more water soluble oxygen catalyst precursors. The wetted carbon particle mixture is dried so as to evaporate the water and form a carbon/catalyst mixture. The carbon/catalyst mixture is blended with a binder to form an active layer mixture and a layer of the active layer mixture is laminated onto a wet-proofing layer to form an active/wet-proofing layer. The active/wet-proofing layer is contacted with a current collector.

The air electrode of this invention, as set forth above, is useful in a metal-air cell. Generally described, such a metal-air cell comprises a cell case, an anode disposed in the cell case, the air electrode of this invention disposed in the cell case, and an electrolyte disposed in the cell case in contact with the anode and the air electrode.

The method of making an air electrode in accordance with this invention is simple and efficient because no high temperature treatment of the catalyst precursor is necessary and the entire process can be conducted at atmospheric pressure and in an air atmosphere. Desirably, the step of drying the wetted carbon particle mixture is conducted at a temperature and a pressure sufficient to evaporate the water in the wetted carbon particle mixture and uniformly distribute the at least one water soluble oxygen evolution catalyst precursor and the at least one water soluble oxygen reduction catalyst precursor throughout the carbon/catalyst mixture without alloying the at least one oxygen evolution catalyst or the at least one oxygen reduction catalyst and without substantially deteriorating the carbon particles. More particularly, the step of drying the wetted carbon particle mixture is conducted at a temperature from about 80 to about 150° C., and more desirably is conducted at a temperature from about 100 to about 150° C.

Alternatively, a bifunctional air electrode can be made according to this invention by wetting carbon particles comprising an oxygen reduction catalyst already deposited thereon with at least one water soluble oxygen evolution catalyst precursor in aqueous solution to form a wetted carbon particle mixture.

Accordingly, an object of the present invention is to provide a metal-air cell with enhanced power output.

Another object of the present invention is to provide a metal-air cell with enhanced power output and a lengthy cycle life.

Yet another object of the present invention is to provide a simple and efficient method for making air electrodes for use in a metal air cell.

Other objects, features and advantages of the present invention will become apparent from the following detailed description, drawings, and claims.

DETAILED DESCRIPTION OF EMBODIMENTS OF THE INVENTION

As summarized above, this invention encompasses a method for making an air electrode using water soluble catalyst precursors, the resulting air electrode, and a rechargeable metal-air electrochemical cell including the electrode. Embodiments of this invention are described in detail below. First, an air electrode made according to an embodiment of the present invention is described followed by descriptions of the method for making the air electrode and a description of a metal-air cell including the air electrode of this invention.

Figure 1:
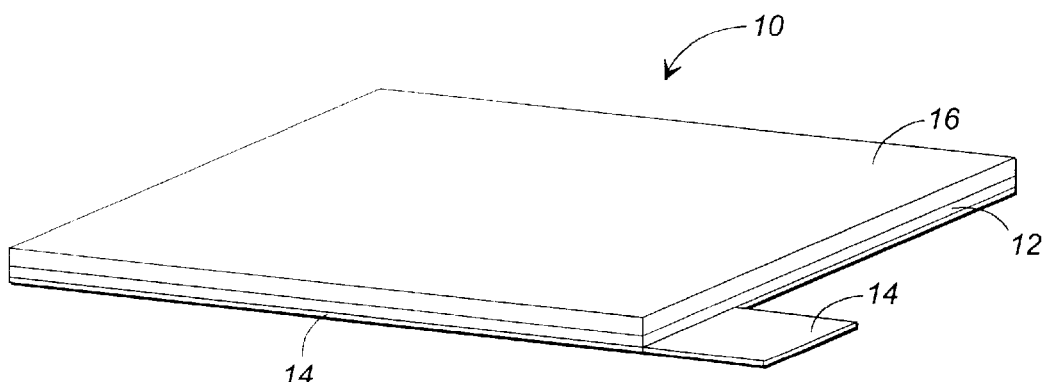
FIG. 1 is a perspective view of a bifunctional air electrode made according to an embodiment of the present invention.

Turning to FIG. 1, a bifunctional air electrode 10 made according to an embodiment of this invention is shown and comprises a wet-proofing layer 12 formed on a current collector 14 and an active layer 16 laminated to the wet-proofing layer. The term air electrode is used synonomously herein with the term cathode.

Generally described, the wet-proofing layer 12 is substantially liquid-impermeable and gas permeable. The wet-proofing layer 12 preferably includes untreated carbon black, such as Shawinigan acetylene black in an amount from about 40 to about 60 percent by weight and a binding/non-wetting agent such as polytetrafluoroethylene in an amount from about 40 to about 60 percent by weight. More preferably, the wet-proofing layer comprises equal amounts of carbon black and polytetrafluoroethylene.

The current collector 14 is preferably a nickel plated screen or nickel expanded metal. Suitable current collectors are effective conductors of electric current and are stable to moist air over an extended period of time.

The active layer 16 of the air electrode 10 comprises a mixture of one or more oxygen reduction catalysts, one or more oxygen evolution catalysts, an oxygen adsorptive particulate material, such as carbon black, and a binder/non-wetting agent. Preferably, the oxygen reduction catalyst and oxygen evolution catalyst are distributed throughout the active layer 16 of the air electrode 10. Oxygen reduction catalysts are sometimes referred to as discharge catalysts because they function during discharge of the cell and oxygen evolution catalysts are sometimes referred to as recharge catalysts because they function during recharge of the cell.

Suitable oxygen evolution catalysts are of a type and are present in the active layer in an amount effective to evolve oxygen during recharge of a metal-air cell and carry out the electrolytic reaction during recharge at a lower oxygen evolution potential than that of the oxygen reduction catalysts so that the oxygen reduction catalysts do not participate in the electrolytic recharge reaction. Suitable oxygen evolution catalysts include nickel, iron, cobalt, compounds including nickel, iron, and cobalt, such as oxides, and mixtures thereof. The oxygen evolution catalysts are preferably present throughout the active layer 16 of the air electrode 10 in an amount sufficient to prevent the oxygen reduction catalysts from participating in the electrolytic reaction during recharge of the cell.

Suitable oxygen reduction catalysts are of a type and are present in an amount effective to produce a satisfactory level of current on the first and subsequent discharge cycles of the metal-air cell in which the air electrode is used. Suitable oxygen reduction catalysts include silver, spinels such as cobalt oxides having the formula $MCo_2O_4$ (M=Ni or Co), transition metal macrocyclics such as cobalt tetramethoxyphenylporphyrin (CoTMPP), and perovskites such as lanthanum/nickel/cobalt oxide ($LaNi_{1-x}Co_xO_y$) or lanthanum/iron/cobalt oxide ($LaFe_{1-x}Co_xO_y$), and mixtures thereof.

The oxygen absorptive particles in the active layer 16 of the air electrode 10 are preferably carbon black. Suitable carbon black has a surface area greater than 60 square meters per gram. Desirably, the carbon black is a fluffy form of carbon black comprising discreet particles in a chain-like structure, such as Shawinigan AB-50 acetylene black available from Chevron Chemical Company. Suitable binder/non-wetting agents include polytetrafluoroethylene (Teflon).

Desirably, the oxygen reduction and oxygen evolution catalysts are initially added to an active layer mixture in the form of water soluble oxygen evolution and oxygen reduction catalyst precursors. Suitable water soluble oxygen reduction catalyst precursors include water soluble silver compounds such as silver nitrate and silver acetate. Suitable water soluble oxygen evolution catalyst precursors include water soluble iron, nickel, and cobalt compounds such as nitrates and acetates of iron, nickel, and cobalt. The nitrates are preferred precursors. A combination of water soluble catalyst precursors and nonwater soluble catalyst can be used, but the use of water soluble catalyst precursors are preferred because of the enhanced power production achieved with air electrodes made with water soluble catalyst precursors and the ease with which air electrodes can be made with water soluble catalyst precursors. The water soluble precursors can be more uniformly distributed throughout the active layer carbon matrix than non-water soluble catalyst material. It is believed that this more uniform distribution enhances the power output of metal air cells including electrodes of this invention.

The active layer 16 of the air electrode 10 is made by wetting carbon black with the water soluble oxygen evolution and reduction catalyst precursors in aqueous solution to form a wetted carbon particle mixture, drying the wetted carbon particle mixture to form a cake, grinding or comminuting the dried cake, blending the carbon/catalyst mixture and a binder such as polytetrafluoroethylene to form an active layer mixture, and laminating a layer of the active layer mixture onto the wet-proofing layer 12. The water soluble oxygen reduction and evolution catalysts can be added to the carbon black in a single aqueous solution or in separate aqueous solutions to form the wetted carbon particle mixture. Desirably, the oxygen evolution and reduction catalysts are added to the carbon black to form a single wetted carbon particle mixture.

The wetted carbon particle mixture containing the water soluble catalyst precursors is dried at a temperature and a pressure and for a time sufficient to evaporate the water, and without substantially deteriorating the catalysts or the carbon black. Desirably, the wetted carbon particle mixture is dried at a temperature from about 80 to about 150° C. and in an atmosphere of air at atmospheric pressure. Preferably, the wetted carbon particle mixture is dried at a temperature from about 100 to about 150° C. The catalyst precursors are not reduced with a chemical reducing agent during preparation of the air electrode. The wetted carbon particle mixture is not chemically treated or filtered during preparation of the air electrode. The wetted carbon particle mixture is simply dried and then directly blended with the binder to form the active layer mixture. The wetted carbon particle mixture is desirably dried for a period from about 10 to about 18 hours to activate the catalysts.

Alternatively, the binder can be added to the initial wetted carbon particle mixture and the entire mixture dried and then ground.

After the wetted carbon particle mixture is dried and ground, the bifunctional air electrode 10 can be completed by conventional methods known to those skilled in the art such as filtration using methanol or water or both as a solvent and the wet paste method using methanol or water as a solvent. U.S. Pat. No. 4,152,489 discloses a suitable wet paste method and the disclosure of such patent is expressly incorporated herein by reference. Desirably, however, the air electrode is completed by the dry press method.

The dry press method comprises pressing a dry wet-proofing layer mixture against the current collector 14 to form the wet-proofing layer 12 and then pressing a dry active layer mixture against the wet-proofing layer to form the active layer 16 and complete the electrode. The wet-proofing layer mixture is formed by mixing carbon particles such as carbon black, a binder such as tetrafluoroethylene, and water. This wet-proofing mixture is dried and then chopped to a particle size of 180 to 300 microns. The electrode is formed by spreading the dry wet-proofing mixture on a current collector, pressing the current collector and wet-proofing layer at high temperature and pressure, and then spreading the active layer mixture described above on top of the wet-proofing layer and pressing the entire electrode at high pressure.

The relative amounts of the components of the active layer 16 may vary. Preferably, however, the oxygen evolution catalyst precursor is present in the active layer 16 of the air electrode 10 in a total amount from about 3 to about 20 percent by weight of the active layer, the oxygen reduction catalyst precursor is present in the active layer in a total amount from about 3 to about 20 percent by weight of the active layer, the carbon black is present in an amount from about 60 to about 90 percent by weight of the active layer, and the polytetrafluoroethylene is present in the active layer in a total amount from about 16 to about 40 percent by weight of the active layer. Preferably, the oxygen evolution catalyst precursor is present in an amount of 5% by weight of the active layer, the oxygen reduction catalyst precursor is present in an amount of 5% by weight of the active layer, the carbon black is present in an amount of 70% by weight of the active layer, and the non-wetting agent/binder is present in an amount of 20% by weight of the active layer.

Various combinations of the water soluble catalyst precursors can be used to make suitable bifunctional air electrodes; however, the combination of silver nitrate, iron nitrate, nickel nitrate, and cobalt nitrate is preferred. The water soluble catalyst precursors are added in amount sufficient to produce concentrations of catalyst in the amounts described above. Preferably, the oxygen evolution catalysts are present in the electrode in a ratio of 2/5/1 parts by weight of iron/nickel/cobalt.

Although it is desirable to form the oxygen reduction catalyst of the electrode with a water soluble oxygen reduction precursor, this invention also encompasses an embodiment wherein water soluble oxygen evolution precursors are added to carbon black which already contains an oxygen reduction catalyst. For example, water soluble oxygen evolution catalyst can be added to silverized carbon black.

Figure 2:
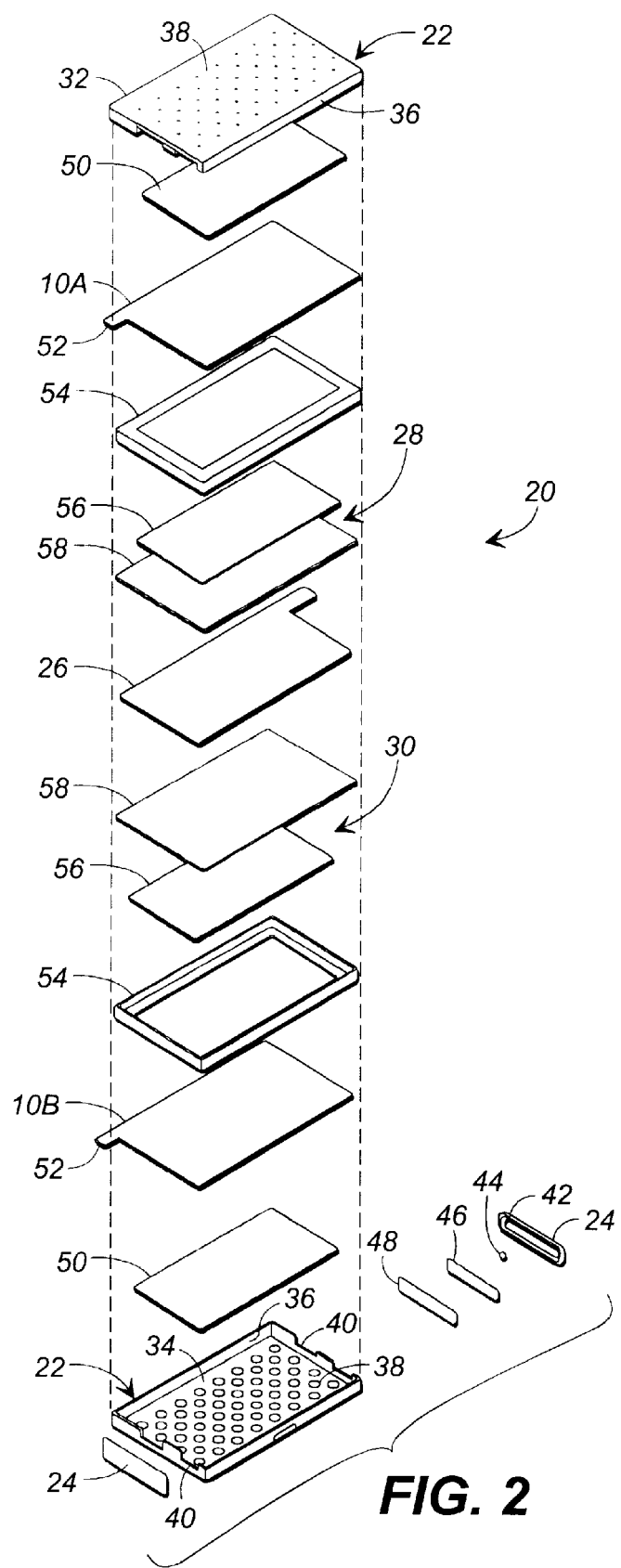
FIG. 2 is an exploded view of the elements of a metal-air cell including a pair of bifunctional air electrodes such as the electrode illustrated in FIG. 1.

Turning to FIG. 2, a zinc-air cell 20 is illustrated in exploded view and includes a pair of air electrodes 10A and 10B having the same structure as the air electrode 10 as illustrated in FIG. 1 and described above. Generally described, the zinc-air cell 20 comprises a cell casing 22, one or more vent caps 24, a dual anode 26, and a pair of separators 28 and 30. The cell case 22 is filled with aqueous electrolyte. Although the metal-air cell 20 described herein is a zinc-air cell, it should be understood that the air electrode of the present invention is applicable to other types of metal-air cells.

The cell case 22 is a multi-piece structure comprising a first air electrode mask wall 32, a second air electrode mask wall 34 opposite the first air electrode mask wall, and a plurality of side walls 36 connecting the first and second mask walls so as to form a prismatic cell case. The cell case 22 is desirably molded from a lightweight plastic, such as polypropylene, which is inert to the electrolyte in the cell case. The respective elements of the cell case 22 are sealed together with a hot melt process or other sealing method.

Each air electrode mask wall 32 and 34 has a plurality of conically-shaped openings 38 to allow air flow or diffusion through the cell case 22 to the air electrodes 10A and 10B of the cell 20. The air openings 38 are desirably evenly spaced across the respective mask walls 32 and 34. The size, number, and shape of air openings 38 in the mask walls 32 and 34 are selected such that sufficient oxygen reaches the air electrodes 10A and 10B through the mask walls to generate the desired current from the cell while preventing excessive moisture transfer into or out of the cell 20 through the mask walls. In addition, the size, number, and shape of the openings 38 and the mask walls 32 and 34 is such that sufficient lateral distribution of oxygen through to the cell is achieved while the thickness of the cell is minimized. Suitable size, number, and shape of the air openings 38 vary depending on the size and use of the cell; however, a suitable arrangement is disclosed in U.S. Pat. No. 5,629,568, the disclosure of which is expressly incorporated herein by reference.

The side walls 36 of the cell case 22 define one or more apertures 40 for venting gas from the cell and filling the cell 20 with electrolyte. These vent apertures are sealed with the vent caps 24 which are desirably constructed of a lightweight plastic such as polypropylene like the remainder of the cell case. Each vent cap 24 defines one or more gas exit holes 42 and is surrounded by a small recess in the interior of the vent cap. This recess is filled with a secondary vent seal 44 via ultrasonic welding or other bonding means. The secondary vent seal 44 is desirably a hydrophobic, gas permeable membrane, such a polypropylene membrane available from Hoechst Celanese Corporation of Charlotte, N.C. under the trademark CELGARD 4599. A vent diffusion membrane 46 fits over the secondary vent seal 44 within the vent caps 24 and is desirably a polyvinyl acetate material such as dexter 7487 polyvinyl acetate material available from Dexter Corporation of Windsor-Locks, Conn. or Porex polyethylene material available from Porex_Technologies, of Fairburn, Ga. The vent diffusion membrane is in turn covered with a primary vent seal 48 which is desirably a microporous teflon film. The vent diffusion membrane 46 and the vent seal 48 are desirably attached to the vent cap 24 with adhesives or other bonding methods. The vent caps 24 can also include a plastic vent support frame (not shown) for holding the vent caps in place. A similar vent structure is described in U.S. Pat. No. 5,362,577, the disclosure of which is expressly incorporated herein by reference in its entirety.

The elements of the cell 20 illustrated in FIG. 2 are assembled in sandwich style. The interior surfaces of the air electrode mask walls 32 and 34 are covered with a layer of absorbent diaper material 50 which is desirably a layer of polyacrylic acetate. The absorbent diaper material 50 is attached to the respective mask walls 32 and 34 with adhesive and other bonding means. The absorbent diaper 50 absorbs any electrolyte that might otherwise leak from the cell through the air openings 38 in the mask walls 32 and 34. The absorbent diaper 50 also assists in the lateral diffusion of ambient air that enters through the mask walls and travels to the air electrodes 10A and 10B.

The first and second air electrodes 10A and 10B are disposed in the cell case 22 against respective first and second mask walls 32 and 34 with the absorbent diaper material 50 between each air electrode and the adjacent mask wall. The wet-proofing layer 12 of each air electrode 10A and 10B faces the adjacent mask wall 32 or 34 and the active layer 16 of each air electrode faces the interior of the cell 20. Each air electrode 10A and 10B has a terminal tab extending out of the casing 20 through respective recesses and the casing side walls 36 to provide negative terminals for the cell.

The air electrodes 10A and 10B are held in place in the cell by the application of adhesives or other bonding methods. In addition, the air electrodes 10A and 10B are further held in place adjacent to the respective mask walls 32 and 34 by respective support frames 54 which, likewise, are held in place by the application of adhesives or other bonding methods. The cathode support frames 54 are made of plastic such as polyethylene and extend about the side walls 36 of the cell case 22. Each support frame 54 has a large central opening so as not to cover the respective air electrode 10A and 10B. The support frames 54 provide structural strength to the cell 20 and prevent electrolyte from leaking around the edges of the air electrodes 10A and 10B and out of the cell 20.

The active layers 16 of the air electrodes 10A and 10B are covered with the first and second separator layers 28 and 30. Each separator layer 28 and 30 comprises a layer of an absorbent fibrous web 56 and a layer of a microporous membrane 58 that, when wet, is gas-impermeable and liquid-permeable. A suitable absorbent fibrous web 56 comprises nylon such as that sold by Hollinsworth and Vose under the designation TR1113H, while a desired microporous membrane 58 comprises a polypropylene membrane such as that sold under the name CELGARD 5511 by Hoechst Celanese Corporation of Charlotte, N.C. The separator layers 28 and 30 are attached to the air electrodes 10A and 10B and the respective support frames 54 by adhesives or other bonding methods.

The anode 26 is disposed in the cell 20 between the first and second separator layers 28 and 30. A suitable anode includes a layer of zinc attached to a current collector. The zinc can be zinc or zinc alloy metal sheet or can be a zinc powder cake. Desirably, the anode 26 is wrapped in an anode bag made of a layer of absorbent fibrous material and a layer of microporous membrane which is gas-impermeable and liquid-permeable when wet. A suitable absorbent fibrous web material is nylon sold by Hollinsworth and Vose under the designation TR1113G and a suitable microporous membrane for the anode bag is CELGARD 5511. A particularly suitable anode is a "split" anode assembly as disclosed in U.S. Pat. No. 5,639,568, the disclosure of which is already incorporated herein by reference.

After the anode 26 is in place, the side walls 36 of the casing are heat sealed together to enclose the cell 20.

Likewise, the vent caps 24 are sealed. Liquid electrolyte is then poured into the cell casing and is substantially absorbed by the fibrous webs and microporous membranes of the separator layers 28 and 30 and the anode. The cell case 22 is then completely sealed.

Suitable electrolyte is aqueous base electrolyte including a Group I metal hydroxide. Examples include LiOH, NaOH, KOH, CsOH, or the like.

During operation of the cells 20, air enters through the openings 38 in the mask walls 32 and 34 and penetrates the layers of the air electrodes 10A and 10B. At the air electrodes 10A and 10B, oxygen from the ambient air initiates an electrolytic reaction that results in the production of current from the cell 20. The transfer of ions between the anode 26 and the air electrodes 10A and 10B is accomplished through the electrolyte absorbed in the separator layers 28 and 30 and the separator bag of the anode 26. When the materials are wet, the ions pass through the microporous membranes and fibrous webs in the cell.

The microporous membranes in the separator layers 28 and 30 and the anode bag limit the growth of dendrites on the zinc anode 26 and prevents the dendrites from growing from the anode to the air electrodes 10A and 10B. Any contact between zinc dendrites from the anode 26 and the air electrodes 10A and 10B short circuits the cell 20. The microporous membranes maintain zinc oxide generated at the anode 26 in intimate contact with the anode.

The microporous membranes in the separator layers 28 and 30 and the anode bag also prevent oxygen gas from reaching the anode and self discharging the cell. Oxygen is allowed to reach the anode only in solution.

The absorbent fibrous webs of the separator layers 28 and 30 and the anode bag absorb substantially all of the electrolyte and trap the electrolyte in place between the anode 26 and the air electrodes 10A and 10B so that the cell 20 can operate in any orientation.

Surprisingly, the use of water soluble catalyst precursors to make air electrodes increases the power output of metal-air cells containing such electrodes. The following Example 1 is designed to disclose a particular embodiment of the present invention and teach one of ordinary skill in the art how to carry out the present invention.

EXAMPLE 1

A bifunctional electrode was made by the dry press method which comprises pressing a dry wet-proofing layer mixture against a current collector followed by pressing a dry active layer mixture against the wet-proofing layer to complete the laminate.

The wet-proofing layer mixture was formed by first mixing 30 grams of Shawinigan AB50 acetylene carbon black with 70 milliliters of distilled water for 20 minutes. This mixture was mixed in a Kitchenaid baking type mixer with a dough (anchor shape) agitator on speed 2. 130 milliliters of distilled water were added to the composition which was mixed for an additional 10 minutes. Separately, 18 grams of teflon 30 having a pH of at least 10 was mixed with 125 milliliters of distilled water and added to the wet-proofing mixture which was then mixed for an additional 40 seconds. The wet-proofing mixture was dried in a convection oven over 20 hours at a temperature of 100° C. The dried mixture was then chopped in a kitchen-type Osterizer blender at crumb setting to a particle size of 180–300 microns.

To form an active layer mixture, 0.65 grams of iron nitrate ($Fe(NO_3)_3 \cdot 9H_2O$), 1.58 grams of nickel nitrate ($Ni(NO_3)_2 \cdot 6H_2O$), 0.29 grams of cobalt nitrate ($Co(NO_3)_2 \cdot 6H_2O$), and 2 grams of $AgNO_3$ were dissolved in 100 ml of deionized water and added to 17 g of graphitized Vulcan X72 carbon black to make a paste. The resulting active layer mixture was then dried for over 20 hours in a convection oven at 100° C. and then ground and passed through a 35 mesh sieve. A mixture of 6 grams of Teflon 30B having a pH of at least 10 and deionized water (60% emulsion) was added to the dry carbon/catalyst mixture and mixed. This wet active layer mixture was then dried in the same convection oven for about 18 hours. The dried active layer mixture was chopped and passed through a 180 mesh sieve.

The bifunctional air electrode was formed by spreading 4.3 grams of the dry wet-proofing layer mixture on an expanded nickel current collector having dimensions 7.6 cm by 14 cm. The current collector was rinsed with MeOH prior to the wet-proofing layer being added to the current collector. The wet-proofing layer mixture and current collector were wrapped in stainless steel foil type 321 and placed between the plates of a hot hydraulic press. The current collector and wet-proofing layer were then pressed for 15 minutes at 400° F. and 9000 psig. 1.9 grams of the dry active layer mixture was then spread on top of the wet-proofing layer and the entire electrode was cold pressed for ten minutes at 2000 psig followed by hot pressing for 15 minutes at 560° F. and 8000 psig.

An air electrode made in accordance with this Example 1 was incorporated into a half cell using 45% KOH electrolyte and discharged. The discharge was measured with a potentiostat/galvanostat and the electrode of Example 1 produced 20% more power than a comparable electrode made with non-water soluble catalyst precursors.

It should be understood that the foregoing relates to preferred embodiments of the present invention and that numerous changes may be made therein without departing from the scope of the invention as defined by the following claims.

We claim:

1. Method for making a bifunctional air electrode for use in a rechargeable metal-air electrochemical cell comprising the steps of:
    wetting carbon particles with at least one water soluble oxygen evolution catalyst precursor in aqueous solution and at least one water soluble oxygen reduction catalyst precursor in aqueous solution to form a wetted carbon particle mixture;
    drying the wetted carbon particle mixture so as to evaporate the water and form a carbon/catalyst mixture;
    blending the carbon/catalyst mixture and a binder to form an active layer mixture;
    laminating a layer of the active layer mixture onto a wet-proofing layer to form an active/wet-proofing layer; and
    contacting a current collector with the active/wet-proofing layer.

2. Method as in claim 1 wherein the step of drying the wetted carbon particle mixture is conducted at a temperature and a pressure sufficient to evaporate the water, without alloying the at least one oxygen evolution catalyst precursor or the at least one oxygen reduction catalyst precursor.

3. Method as in claim 1 wherein the step of drying the wetted carbon particle mixture is conducted at atmospheric pressure in a atmosphere of air.

4. Method as in claim 1 wherein the step of drying the wetted carbon particle mixture is conducted at a temperature from about 80 to about 150° C.

5. Method as in claim 1 wherein the carbon particles comprise carbon black, the at least one oxygen reduction catalyst precursor comprises silver nitrate, and the wetted carbon particle mixture comprises a plurality of oxygen evolution catalyst precursors including nickel nitrate, iron nitrate, and cobalt nitrate.

6. Method as in claim 1 wherein the carbon particles comprise carbon black.

7. Method as in claim 1 wherein the at least one oxygen reduction catalyst precursor comprises a water soluble silver compound.

8. Method as in claim 1 wherein the at least one oxygen reduction catalyst precursor comprises silver nitrate or silver acetate.

9. Method as in claim 1 wherein the at least one oxygen evolution catalyst precursor is selected from the group consisting of water soluble nickel, iron, and cobalt compounds.

10. Method as in claim 1 wherein the at least one oxygen evolution catalyst precursor is selected from the group consisting of nickel nitrate, iron nitrate, cobalt nitrate, nickel acetate, iron acetate, and cobalt acetate.

11. Method as in claim 1 wherein the wetted carbon particle mixture comprises a plurality of oxygen evolution catalyst precursors including a water soluble nickel compound, a water soluble iron compound, and a water soluble cobalt compound.

12. Method as in claim 1 wherein the wetted carbon particle mixture comprises a plurality of oxygen evolution catalyst precursors including nickel nitrate or nickel acetate, iron nitrate or iron acetate, and cobalt nitrate or cobalt acetate.

13. Method as in claim 1 wherein the wetted carbon particle mixture comprises a plurality of oxygen evolution catalyst precursors including nickel nitrate, iron nitrate, and cobalt nitrate.

14. Method as in claim 1 wherein the binder is polytetrafluoroethylene.

15. Method as in claim 1 wherein the oxygen evolution catalyst precursor is present in an amount from about 2 to about 20% by weight of the active layer, the oxygen reduction catalyst precursor is present in an amount from about 2 to about 20% by weight of the active layer, the carbon particles are present in an amount from about 60 to about 90% by weight of the active layer, and the binder is present in an amount from about 16 to about 40% by weight of the active layer.

16. Method as in claim 15 wherein the binder is polytetrafluoroethylene.

17. Method for making a bifunctional air electrode for use in a rechargeable metal-air electrochemical cell comprising the steps of:
    wetting carbon particles with at least one water soluble oxygen evolution catalyst precursor in aqueous solution to form a wetted carbon particle mixture, the carbon particles comprising an oxygen reduction catalyst deposited thereon;
    drying the wetted carbon particle mixture so as to evaporate the water and form a carbon/catalyst mixture;
    blending the carbon/catalyst mixture and a binder to form an active layer mixture;
    laminating the active layer onto a wet-proofing layer to form an active/wet-proofing layer; and
    contacting a current collector with the active/wet-proofing layer.

* * * * *